United States Patent
Angelhag et al.

(10) Patent No.: US 7,843,333 B2
(45) Date of Patent: Nov. 30, 2010

(54) SYSTEM, METHODS, DEVICES AND COMPUTER PROGRAM PRODUCTS FOR CONTROLLING ELECTRONIC APPLIANCES WITHIN A LOCAL AREA

(75) Inventors: Anders Angelhag, Lund (SE); William O. Camp, Jr., Chapel Hills, NC (US)

(73) Assignee: Sony Ericsson Mobile Communication AB, Lund (SE)

( * ) Notice: Subject to any disclaimer, the term of this patent is extended or adjusted under 35 U.S.C. 154(b) by 946 days.

(21) Appl. No.: 11/679,961

(22) Filed: Feb. 28, 2007

(65) Prior Publication Data

US 2008/0181172 A1    Jul. 31, 2008

Related U.S. Application Data

(60) Provisional application No. 60/886,713, filed on Jan. 26, 2007.

(51) Int. Cl.
*G08B 1/08* (2006.01)
(52) U.S. Cl. ............ 340/539.13; 340/825.49; 340/825.72; 455/414.1; 455/41.2
(58) Field of Classification Search ........... 340/539.13, 340/825.69, 825.72, 825.49, 7.55; 370/338, 370/252; 455/414.1, 41.2, 410
See application file for complete search history.

(56) References Cited

U.S. PATENT DOCUMENTS 6,563,430 B1 * 5/2003 Kemink et al. ......... 340/825.49

6,791,467 B1 * 9/2004 Ben-Ze'ev ............ 340/825.69
2004/0095276 A1   5/2004 Krumm et al.
2005/0094610 A1   5/2005 de Clerq et al.

FOREIGN PATENT DOCUMENTS

WO    2005/078676    8/2005

OTHER PUBLICATIONS

International Search Report for corresponding Application No. PCT/IS2007/002114 mailed Feb. 15, 2008.

* cited by examiner

*Primary Examiner*—Anh V La
(74) *Attorney, Agent, or Firm*—Renner, Otto, Boisselle & Sklar LLP

(57) ABSTRACT

A system, methods, devices and computer program products for controlling the operation of at least one electronic appliance, e.g. a TV, a music system, a lighting system, a kitchen appliance or an alarm system, located within a local area. The system has a mobile terminal located within the local area, the mobile terminal being configured to transmit a short-range radio signal to one or more short-range devices located within the local area. Each short-range device of the plurality of short-range devices located within the local area is configured to receive a short-range radio signal from the mobile terminal, perform a signal measurement of signal delay, signal strength, or both signal delay and signal strength of said short-range radio signal received from the mobile terminal, and transmit information about said measurement to an electronic apparatus. The electronic apparatus is configured to subsequently receive this information about the signal measurements from the plurality of short-range devices. In response thereto, the electronic apparatus is operable to determine the location of the mobile terminal, and control the operation of the at least one electronic appliance in dependence of the determined location of the mobile terminal.

18 Claims, 5 Drawing Sheets

SYSTEM, METHODS, DEVICES AND COMPUTER PROGRAM PRODUCTS FOR CONTROLLING ELECTRONIC APPLIANCES WITHIN A LOCAL AREA

CROSS REFERENCE TO RELATED APPLICATION

This application claims priority under 35 U.S.C. §119 to U.S. Provisional Application No. 60/886,713, filed Jan. 26, 2007, the entire disclosure of which is incorporated herein by reference.

TECHNICAL FIELD

The present invention relates in general to communication systems and, more particularly, to methods, devices, computer program products and a system for controlling one or more electronic appliances within a local area, e.g. a home or an office location.

DESCRIPTION OF RELATED ART

The digital era has digitized various electronic appliances, e.g. TV's, music systems, personal computer products (PC products), kitchen appliances e.g. microwave ovens, etc. such that the operation thereof can be centrally controlled by a computer system. In other words, the computer system becomes the central hub or control gate system for the various digital electronic appliances. Therefore, the on/off control of various digital electronic appliances can become easier and more humane for the users of such digital electronic appliances.

The avalanche of digitized electronic appliances has made it possible to create digital local areas, e.g. digital homes or digital office locations, in which the various electronic appliances are tied into a more or less seamless multimedia environment. A digital local area such as a digital home may be an entire habitat with the user right at the center. Whatever lifestyle of the user, the digital home can make the life more entertaining, more productive and more fun.

It would be desirable to control the various electronic appliances of a digital local area, e.g. the digital home, in dependence of the location of the user within the digital home. For example, it may be desirable to vary the behavior of lighting when the user enters a certain room of the home. Furthermore, it may be desirable to vary the behavior of a TV when the user enters the TV room. Still further, it may be desirable to control the behavior of a microwave oven or a refrigerator when the user is located in the kitchen.

However, there is no current method and/or system that allow for controlling various electronic appliances within a digital local area in dependence of the location of a user within said digital local area. Therefore, there is a need for providing a solution for controlling various electronic appliances in a digital local area in dependence of the location of the user. More particularly, there is a need for a solution that allows for a relatively simple, inexpensive and preferably, automatic, control of the various electronic appliances within the digital local area in dependence of the location of the user.

SUMMARY OF THE INVENTION

According to an embodiment of the invention, a system for controlling the operation of at least one electronic appliance within a local area is provided. The system comprises:

a mobile terminal located within the local area and configured to transmit a short-range radio signal to a short-range device;

a plurality of short-range devices within the local area, wherein each short-range device of the plurality of short-range devices is configured to receive a short-range radio signal from the mobile terminal; perform a signal measurement of signal delay, signal strength, or both signal delay and signal strength of said short-range radio signal received from the mobile terminal; and transmit information about said measurement to an electronic apparatus;

an electronic apparatus configured to receive information about said signal measurement from the plurality of short-range devices within the local area; in response thereto determine the location of the mobile terminal; and control the operation of the at least one electronic appliance in dependence of the determined location of the mobile terminal.

The electronic apparatus may be configured to determine the location of the mobile terminal by comparing the different signal measurements performed by the short-range devices and based on said comparison determine which of the plurality of short-range devices is located in closest proximity to the mobile terminal.

The mobile terminal may be a portable radio communication equipment, a mobile radio terminal, a mobile telephone, a cellular telephone, a pager, a communicator, an electronic organizer, a smart phone, a computer or a headset.

According to another embodiment of the invention, a short-range device for assisting an electronic apparatus in controlling the operation of at least one electronic appliance within a local area is provided. The short-range device comprises:

a receiver configured to receive a short-range radio signal from a mobile terminal located within the local area;

a measurement unit configured to perform a signal measurement of signal delay, signal strength, or both signal delay and signal strength of said radio signal received from the mobile terminal; and a transmitter configured to transmit information about the signal measurement to an electronic apparatus within the local area.

The receiver may additionally be configured to receive information about at least one further signal measurement of signal delay, signal strength, or both signal delay and signal strength of a radio signal received from the mobile terminal, wherein said at least one further signal measurement is performed by another short-range device of a plurality of short-range devices within the local area; and the transmitter may additionally be configured to transmit the information about the at least one further signal measurement to the electronic apparatus within the local area.

The short-range device may be an accessory device or a stand-alone short-range device.

The short-range device may be a Bluetooth device configured to communicate short-range radio signals according to a Bluetooth technology.

According to yet another embodiment of the invention, an electronic apparatus for use with the short-range device described above for controlling the operation of at least one electronic appliance within a local area is provided. The electronic apparatus comprises:

a receiver configured to receive from the short-range device information about said signal measurement;

a determination unit configured to determine the location of the mobile terminal based on the received information about said signal measurement; and a controller configured to control the operation of the at least one electronic appliance in dependence of the determined location of the mobile terminal.

The determination unit may be configured to determine the location of the mobile terminal by comparing different signal measurements performed by different short-range devices of a plurality of short-range devices and determine based on said comparison which short-range device of the plurality of short-range devices is located in closest proximity to the mobile terminal.

The electronic apparatus may be configured to control the operation of the at least one electronic appliance via a wired connection or via a wireless connection.

The at least one electronic appliance may be the mobile terminal, a TV, a display screen, a music system, a speaker, a lighting system, a kitchen appliance, a home entertainment system, an alarm system, a surveillance system, a personal computer (PC), or a telephone.

According to still another embodiment of the invention, a method of controlling the operation of at least one electronic appliance within a local area is provided. The method comprises:

transmitting from a mobile terminal within the local area a short-range radio signal to one or more short-range devices;

receiving at a plurality of short-range devices within the local area a short-range radio signal from the mobile terminal; performing at each short-range device a signal measurement of signal delay, signal strength, or both signal delay and signal strength of said short-range radio signal received from the mobile terminal; and transmitting from each short-range device information about the signal measurement to an electronic apparatus;

receiving at an electronic apparatus the information about said signal measurements performed by the plurality of short-range devices; in response thereto determining the location of the mobile terminal, and further controlling the operation of the at least one electronic appliance in dependence of the determined location of the mobile terminal.

The determining may comprise:

comparing the different measurements performed by the plurality of short-range devices; and determining which of the plurality of short-range devices is located in closest proximity to the mobile terminal based on said comparison.

According to a further embodiment of the invention, a method of assisting in controlling the operation of at least one electronic appliance within a local area is provided. The method is performed by a short-range device and comprises:

receiving a short-range signal from a mobile terminal located within the local area;

performing a measurement of signal delay, signal strength, or both signal delay and signal strength of said radio signal received from the mobile terminal; and transmitting information about the signal measurement to an electronic apparatus within the local area.

The method may further comprise:

receiving information about at least one further signal measurement of signal delay, signal strength, or both signal delay and signal strength of said radio signal received from the mobile terminal, wherein said at least one further signal measurement is performed by another short-range device of a plurality of short-range devices within the local area; and transmitting the information about the at least one further signal measurement to the electronic apparatus.

According to a still further embodiment of the invention, a method performed by an electronic apparatus for use with the previously described method for controlling the operation of at least one electronic appliance within a local area is provided. The method comprises:

receiving from the short-range device information about said signal measurement;

determining the location of the mobile terminal based on the received information about said signal measurement; and controlling the operation of the at least one electronic appliance in dependence of the determined location of the mobile terminal.

The determining may comprise:

determining the location of the mobile terminal by comparing different signal measurements performed by different short-range devices of a plurality of short-range devices and determining which short-range device of the plurality of short-range devices is located in closest proximity to the mobile terminal.

According a still another embodiment of the invention, a computer program product is provided. The computer program product comprises computer program code means for performing any of the methods described above when said computer program code means is executed by means of an electronic device having computer capabilities.

Some embodiments of the invention provide a relatively simple and, hence also inexpensive, system for controlling various electronic appliances in a digital local area in dependence of the location of the user.

It is an advantage with some embodiments of the present invention that they need not make use of fixedly installed and technically advanced sensors or detectors for controlling the operation of one or more electronic appliances. Rather, relatively simple and inexpensive short-range devices, e.g. small stand-alone Bluetooth-enabled devices, can be scattered throughout local area, e.g. an home environment. These short-range devices can be used to coarsely determine in which room of the home environment the user of the mobile telephone is located. Then, the various electronic appliances, e.g. a TV, a music system, a lighting system, an alarm system, etc., can be controlled by means of the electronic apparatus in dependence of the determined coarse location of the mobile telephone.

BRIEF DESCRIPTION OF THE DRAWINGS

Further objects, features and advantages of the invention will appear from the following detailed description of embodiments of the invention, wherein embodiments of the invention will be described in more detail with reference to the accompanying drawings, in which.

DETAILED DESCRIPTION OF EMBODIMENTS

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
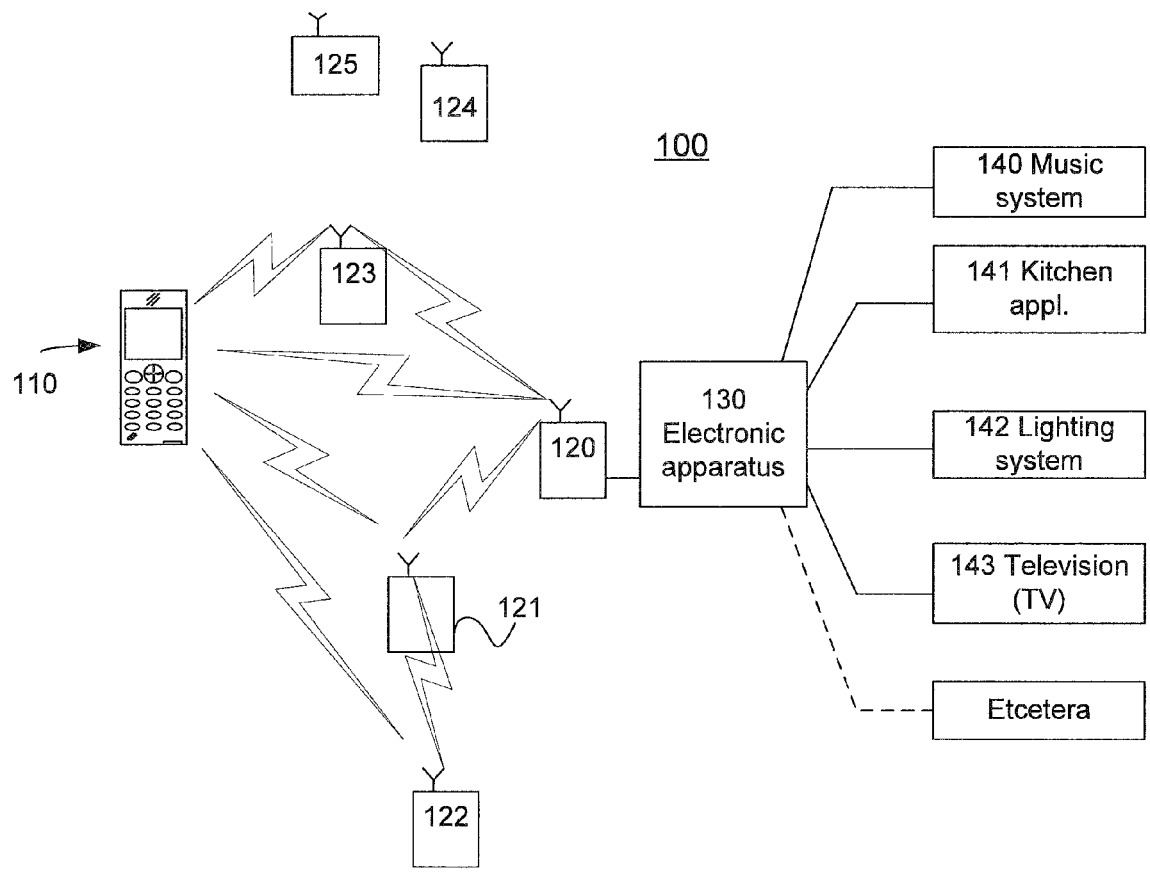
FIG. 1 is a block diagram illustrating an exemplary network diagram comprising a mobile terminal, short-range devices, an electronic apparatus, and electronic appliances.
Figure 2:
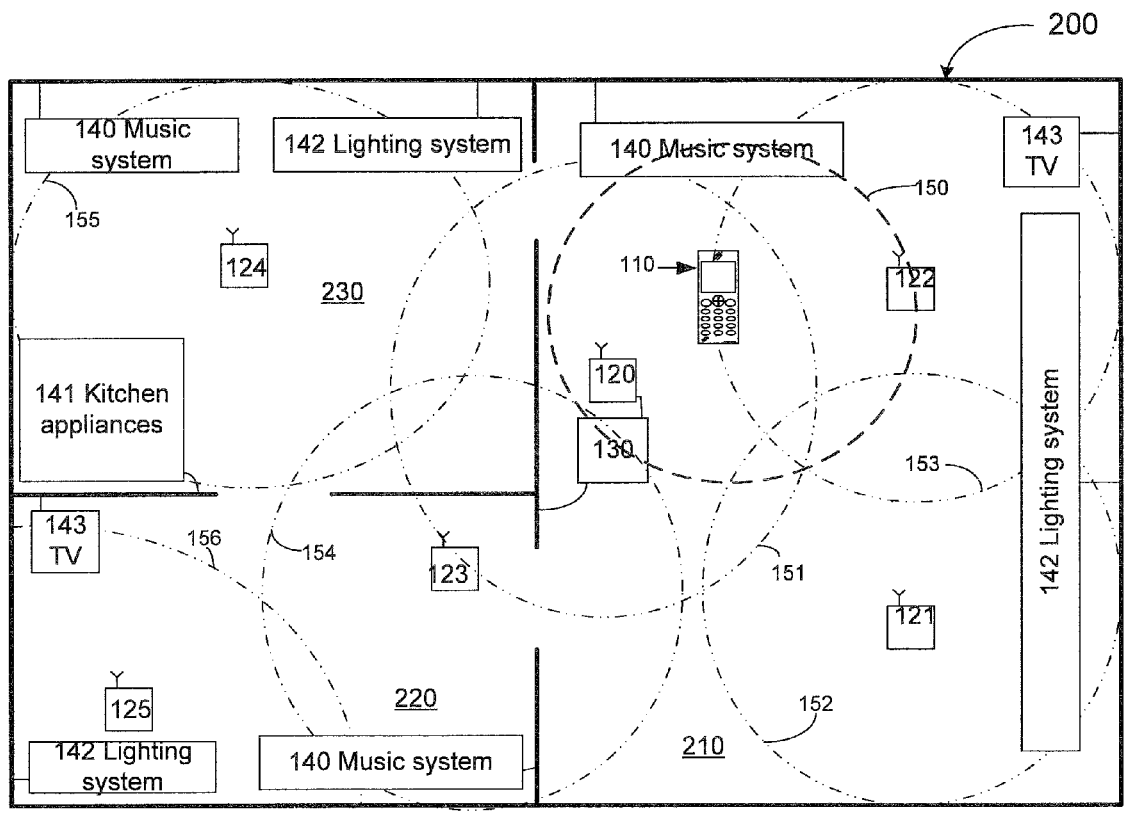
FIG. 2 is a block diagram illustrating the network diagram of FIG. 1 when implemented in a home environment.

FIG. 1 illustrates schematically a communication system 100 within a local area, such as a home environment 200 (see FIG. 2) in which embodiments of the invention can be implemented. FIG. 2 illustrates a home environment 200, which includes a living room 210, a bedroom 220, and a kitchen 230. However, it is to be understood that embodiments of the present invention can be used in any environment, including but not limited to a home environment, an office environment, a retailer environment, etc. As shown in FIGS. 1 and 2, the system 100 comprises a mobile terminal 110, e.g. a mobile telephone, one or more short-range devices 120, 121, 122, 123, 124, 125, an electronic apparatus 130 and one or more electronic appliances 140, 141, 142, 143. As is further disclosed in FIG. 2, the one or more short-range devices 120-125 are scattered throughout the home environment. For example, the one or more short-range devices 120-125 may be set out throughout the home environment 200 such that there is only one or two short-range devices 121-125 in each room of the home environment 200. Thus, each of the scattered short-range devices 120-125 may be associated with a specific area, e.g. a room, of the home environment 200. In one embodiment, each of the short-range devices 120-125 is associated with an area-ID, e.g. a room-ID.

In FIGS. 1 and 2, the mobile terminal 110 is embodied as a mobile telephone. Embodiments of the invention may be implemented into a wide variety of mobile terminals. The mobile terminal 110 may e.g. be a portable radio communication equipment, a mobile radio terminal, a mobile telephone, a cellular telephone, a pager, a communicator, an electronic organizer, a smart phone and a computer, etc. Reference will however be to a mobile telephone 110 below, which is only for illustrative purpose and should not be considered as limiting to the embodiments of the invention set forth herein.

The mobile telephone 110, which is located within the local area 200, is configured to communicate, i.e. transmit and/or receive, a short-range radio signal to and/or from one or more of the short-range devices 120-125 located within its short-range coverage area 150. For example, the mobile telephone 110 may be operable to communicate short-range radio signals according to the Bluetooth® technology (operable at approximately 2.4 GHz). The Bluetooth® technology is a short-range radio technology, which makes it possible to communicate radio signals over short distances, i.e. short-range radio signals, between Bluetooth enabled devices. Using the current Bluetooth® technology, the distance between communicating Bluetooth® enabled devices may be up to 10 meters in a low power mode or as much as up 100 meters in a high power mode. The Bluetooth® technology is well-known among persons skilled in the art and will therefore not be further described herein.

The system 100 comprises two or more short-range devices 120, 121, 122, 123, 124, 125 within the local area. The short-range devices may e.g. be relatively simple accessory devices and/or stand-alone short-range devices. In the disclosed embodiment, the short-range devices 120-125 are Bluetooth devices which are operable to communicate short-range radio signals according to the Bluetooth® technology described hereinabove. Each of these short-range devices 120-125 is configured to communicate short-range radio signals with other short-range devices 120-125 within their respective coverage area 151, 152, 153, 154, 155. Each of these short-range devices 120-125 is also configured to communicate short-range radio signals with the mobile telephone 110 when the mobile telephone 110 is within the coverage area of the short-range device in question. Moreover, each of the short-range devices 120-125 is configured to communicate with the electronic apparatus 130. The communication between the electronic apparatus 130 and each of the short-range devices 120-125 could be either via a wired connection or via a wireless connection. Furthermore, each of the short-range devices 120-125 could connect wirelessly to the electronic apparatus 130 by connecting to the other short-range devices 120-125 until reaching the electronic apparatus 130. In the disclosed embodiment, the connection between the short-range device 120 and the electronic apparatus 130 is a wired connection. However, it should be appreciated that in other embodiments this connection may be a wireless connection.

It should be appreciated that the short-range devices 120-125 are scattered throughout the local area 200. The short-range devices 120-125 may be scattered throughout the entire local area 200 in a way such that the respective coverage areas 151, 152, 153, 154, and 155 of the short-range devices 120-125 do not overlap each other completely. Further, the short-range devices 120-125 may be scattered throughout the local area 200 such that the respective coverage areas 151, 152, 153, 154, and 155 of the short-range devices 120-125 together cover most of or all of the total area of the local area 200. Each of the short-range devices 120-125 is configured to receive a short-range radio signal from a mobile telephone, such as the mobile telephone 110, when the mobile telephone 110 is within the coverage area of the short-range device in question. Furthermore, each of the short-range devices is configured to perform a measurement of signal delay, signal strength, or both signal delay and signal strength of the short-range radio signal received from the mobile telephone 110. Still further, each of the short-range devices 120-125 is configured to transmit information about said measurement to the electronic apparatus 130. In the disclosed example, each of the short-range devices may transmit said information to the electronic apparatus 130 via the short-range device that is connected to the electronic apparatus 130, i.e. short-range device 120 (See FIGS. 1 and 2). In other words, each of the short-range devices 120-125 may transmit information about said measurement to the short-range device 120 that is connected to the electronic apparatus 130. The information could be transmitted to this short-range device 120 either directly or via one or more of the other short-range devices 121-125. Alternatively, the short-range devices 120-125 could be hooked to a Local Area Network (LAN) within the local area 200 and communicate directly with the electronic apparatus 130 via said LAN.

The electronic apparatus 130 is configured to receive information about signal measurements from each short-range device of the plurality of short-range devices. Based on the information from all measurements that has been performed by the various short-range devices, the electronic apparatus 130 is configured to determine the location of the mobile telephone 110. This may e.g. be performed by comparing the different measurements made by the different short-range devices 120-125 and determine which of the short-range devices, 120-125, is located in closest proximity to the mobile telephone 110. Accordingly, information about the location of the mobile telephone 110 within the local area 200 may be determined by the electronic apparatus 130. The information about the location need not be exact. It may e.g. suffice that this information is an indication of a coarse location of the mobile terminal, e.g. in which room of the home environment 200 the mobile telephone 110 is located. Since each of the short-range devices are associated with a specific local area of the home environment, e.g. a room, by determining which of the short-range devices 120-125 is in closest proximity to the mobile telephone 110 it is also possible to determine where in the home environment 200 the mobile telephone is located.

As described earlier hereinabove, each of the scattered short-range devices 120-125 may be associated with a specific area, e.g. a room, of the home environment. Thus, there may be an association between a particular short-range device and a particular room as a starting point and, hence, the closest short-range device as determined by the strongest signal strength or shortest delay gives an indication of which room the mobile terminal 110 is located in at the time of measurement(s). If one places short-range devices 120-125 such that they are not particularly near an opening to an adjacent room (doorway), this will work well. However, it appears to be possible that the electronic apparatus 130, acting as a central server for the system, could over a learning period and by combining these measurements from two or more short-range devices determine that, for instance, noticing a strong measurement from short-range device 123, but also noticing a slightly weaker signal from short-range device 124, and at the same time not noticing a signal from short-range device 121 means that the mobile terminal is in fact in the room labeled 220. This learning could occur either in a dedicated time period or over the normal usage of the system 100. In either case, feedback will most probably be required from the user via the mobile terminal 110 to the electronic apparatus 130 making the location determination, whether a correct room is being selected. There are many learning algorithms that could be applied to this task, such as those used in gradient descent or even the less formal "neural network" categories.

In the preferred and disclosed embodiment, the electronic apparatus 130 is configured to act as a central server device between the various short-range devices 120-125 and one or more electronic appliances 140, 141, 142, and 143. It should be appreciated that the electronic apparatus 130 may be connected to the one or more electronic appliances 140-143 either via a wired connection or via a wireless connection. Furthermore, although not explicitly shown in the drawings, it would also be possible that the short-range devices 120-125 may, additionally, be associated with and even connected to one or more of electronic appliances 140-143. For instance, short-range device 125 could be connected to the TV 143.

Embodiments of the invention may be used for a wide variety of electronic appliances. An electronic appliance may e.g. be a TV, a music system, a lighting system, a kitchen appliance, a home entertainment system, a personal computer (PC), a telephone or even the mobile telephone 110, etc. In the disclosed embodiment, the electronic apparatus 130 may be configured to receive the information about the determined location of the mobile telephone 110 from the short-range device that is connected to the electronic apparatus 130, i.e. short-range device 120 in this example. In the disclosed embodiment, the electronic apparatus 130 is further configured to use this information for controlling one or more of the electronic appliances 140-143 in dependence thereof. Accordingly, the one or more electronic appliances 140 may be controlled in dependence of where in the local area 200 the mobile telephone 110 is located. It should be appreciated that the electronic appliances 140-143 could be controlled either separately or simultaneously by means of the electronic apparatus 130.

It should be appreciated that a main purpose of some embodiments of the invention is to provide the ability to control various electronic appliances 140-143 within the local area 200 in dependence of the location of the mobile terminal 110. As described earlier, the information about the location of the mobile terminal 110 need not be exact. It may e.g. suffice that this information is an indication of a coarse location of the mobile terminal. In fact, there are various ways of determining a coarse or arbitrary location of the mobile terminal 110. In one embodiment, each of the short-range devices 120-125 performs a signal measurement of e.g. signal strength of a short-range signal received from the mobile terminal 110. Information about this signal measurement is then sent to the electronic apparatus 130. The electronic apparatus 130 may in turn comprise a database, a data table or the like for storing information about earlier signal measurements in the form of reference measurements. These reference measurements may either be collected during a training session or, alternatively, the system 100 may be adaptive and continuously learn from how the user acts together with the mobile terminal and the electronic appliances 140-143. Accordingly, the electronic apparatus 130 may compare a currently performed signal measurement with the reference measurements stored in the electronic apparatus 130 and based on this information determine a coarse location of the mobile terminal 110. A data table could, for example, look like this, wherein the electronic apparatus 130 is configured to determine a coarse location of the mobile terminal based on a signal measurement of strongest received signal strengths.

|  | Alt 1 | Alt 2 | Alt 3 | Alt 4 | Alt 5 | Alt 6 |
| --- | --- | --- | --- | --- | --- | --- |
| Strongest Signal Strength | Device 120 | Device 120 | Device 125 | Device 121 | Device 121 | Device 124 |
| 2nd Strongest Signal Strength | Device 123 | Device 122 | Device 123 | Device 122 | Device 120 | Device 124 |
| 3rd Strongest Signal Strength | Device 121 | Device 121 | Device 120 | Device 120 | Device 122 | Device 123 |
| Determined Arbitrary position | Room 210 | Room 210 | Room 220 | Room 210 | Room 210 | Room 230 |

For example, when the electronic apparatus 130 sorts a current result as 1) Device 120 2) Device 123 3) Device 121, the electronic apparatus 130 may determine that the mobile terminal 110 is located in the room labelled 210.

In another example, a data table could look like this, where the electronic apparatus 130 is configured to sort the measurement data within thresholds. During a training period, when the data table is created by the electronic apparatus 130, a user of the mobile terminal walks around the local area 200 with his/her mobile terminal from room by room while the short-range devices 120-125 continuously collect various signal strengths from the mobile terminal 110 as the mobile terminal 110 moves from one room (i.e. location) to another. Thus, the electronic apparatus 130 could collect signal measurement reference data over time.

| Aribtaray resulting position | The measurement of mobile terminal signal strength at device 120 | The measurement of mobile terminal signal strength at device 123 | The measurement of mobile terminal signal strength at device 124 |
| --- | --- | --- | --- |
| Room 210 | 5-20 | 5-15 | 0-20 |
| Room 220 | 0-5 | 10-20 | 5-15 |
| Room 230 | 0-10 | 0-15 | 10-20 |

Of course the two above-mentioned examples can be used with more type of signal measurements or with data used from both smaller or higher number of short-range devices or even from a varying number of short-range devices.

The system 100 according to embodiments of the invention provide for controlling the operation of one or more electronic appliance 140-143 within the local area 200 in dependence of where in the local area network 200 the mobile telephone 110 is located. When the user and the mobile telephone 110 of the user are in the same location (which is most often the case) location-dependent services can be provided within the local area 200 in dependence of where in the local area the user is currently located. Accordingly, when the user is in a particular room of the home environment 200, the location of his/her mobile telephone 110 may trigger a change of the behavior of one or more electronic appliances in that room. For example, when it is determined that a certain short-range device 122 in the living room is closest to the mobile telephone, the lighting device 142 of the living room and the TV 143 of the living room may be switched on. As another illustrative example, when it is determined that another certain short-range device 124 in the kitchen is closest to the mobile telephone 110, one or all of the music system 140 of the kitchen, the kitchen appliances 141, and the lighting device 142 of the kitchen may be turned on.

Embodiments of the invention may be employed in different scenarios, some of which will now be explained. One such scenario involves a music service, which provides the user of mobile telephone 110 with music as the user moves around in the home environment 200. If there is provided a music system 140 with a loudspeaker in each of the rooms of the home environment 200, the music may follow the user when the user moves from one room to another. Accordingly, when the user bringing his/her mobile telephone 110 with himself/herself enters a new room, e.g. the bedroom, the audio of the music system may be transferred to that room and simultaneously turned off in the previously left room, e.g. the living room.

Another scenario involves a lighting service, which provides the user of mobile telephone 110 with lighting as the user moves around in the home environment 200. If there is provided a lighting system 142 in the local area with lighting devices in each of the rooms of the home environment 200, the lighting may follow the user when the user moves from one room to another. Accordingly, when the user bringing his/her mobile telephone 110 with himself/herself enters a new room, e.g. the kitchen, the light may be turned on in that room and simultaneously turned off in the previously left room, e.g. the living room.

Still another scenario involves an alarm service. For example, when it is determined that the user moves away from the coverage area of all short-range devices of the home environment 200 this could trigger the activation of an alarm system to prevent burglary.

Yet another scenario involves personalizing various services in dependence of who the user is. For example, the music service described above can be personalized in dependence of who is in the room. As another example, the displaying of information on various electronic appliances, e.g. the TV, may be changed in dependence of who is in the room. For example, it would be possible to associate a profile or set of profiles, either at electronic apparatus 130 or associated with each electronic appliance 140-143 or even communicated from the mobile telephone 110. Hence, the correct profile, i.e. the one associated with a particular phone 110 and its associated user, would be set in the electronic appliance to, for instance, cause a subset of music to be played, or a subset of TV channels to be available on TV 143, or preferred light level to the set. The profiles are communicated or otherwise activated in the electronic appliances in the room in which the user with his/her mobile telephone 110 is presently in.

In still a further scenario, embodiments of the present invention may be utilized for a plurality of mobile terminals, e.g. mobile telephones, simultaneously. This could provide for a system where multiple mobile terminals cause multiple operations at various locations of the local area, e.g. the home environment 200. For example, as explained above, multiple users with multiple mobile telephones 110, could be associated with profiles for each electronic appliance and for each user (or more correctly each mobile telephone of the user). For example, there could be an a priori ranking of profiles (e.g. mobile telephone associated with father has a higher priority than that of the son or daughter but not that of the wife).

In the following, the various components of the system 100 will be described separately in some more detail.

Mobile Telephone 110

Figure 3A:
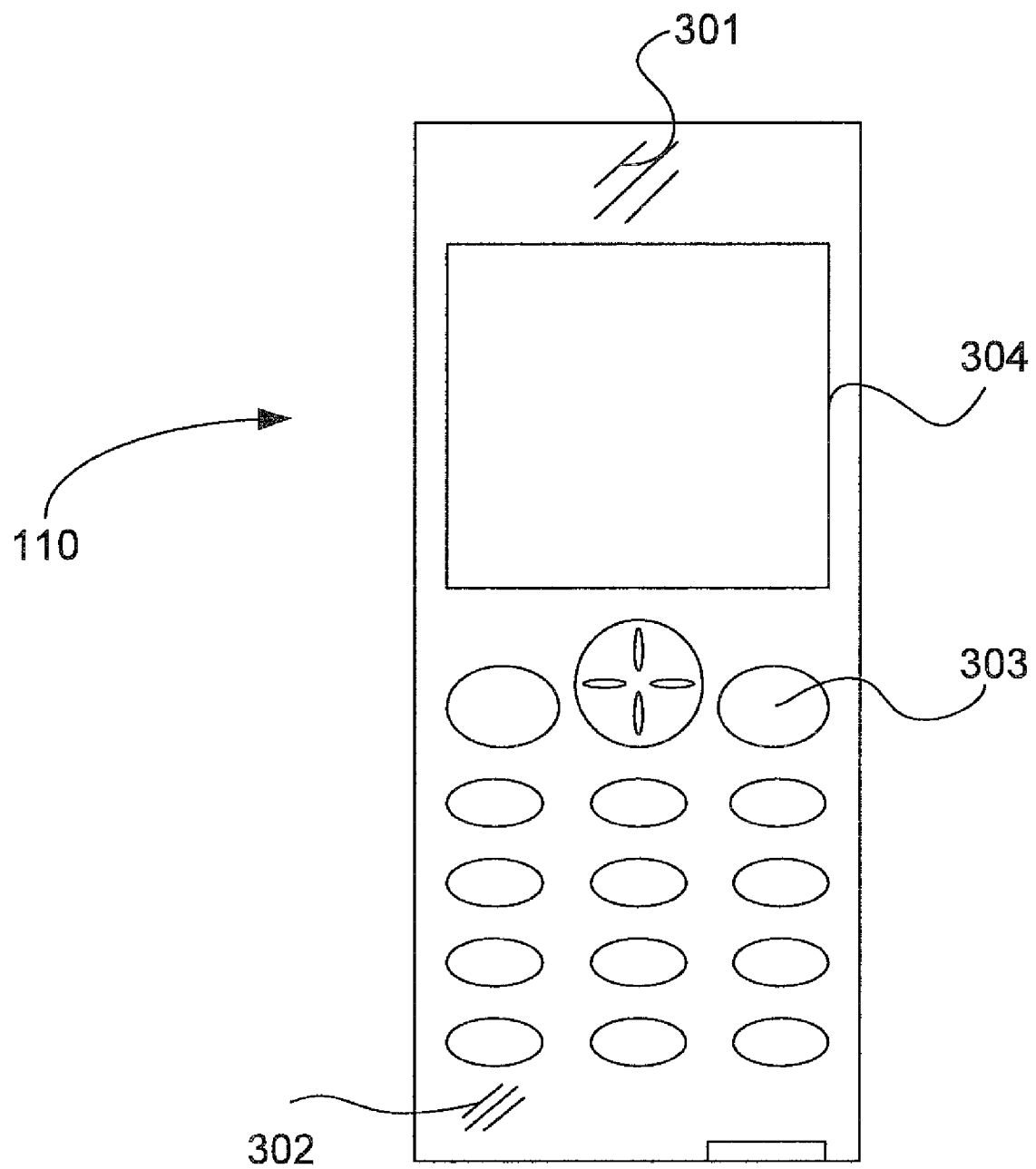
FIG. 3A illustrates an embodiment of the mobile terminal of FIGS. 1 and 2.

FIG. 3A illustrates an embodiment of the mobile telephone 110 illustrated in FIGS. 1 and 2. The mobile telephone 110 typically comprises a user interface for interacting with and operating the mobile telephone 110. The user interface may comprise a loudspeaker 301, a microphone 302, a keypad 303, and a display 304. Moreover, the mobile telephone 110 comprises a built-in antenna (not shown) for receiving/transmitting signals to and from a telecommunication network (not shown) through which the mobile telephone 110 can communicate with other mobile terminals. According to embodiments of the invention, the mobile telephone 110 may also use the antenna to communicate short-range radio signals, e.g. according to the Bluetooth® technology, to and/from short-range devices 120-125. The structure and operation of a mobile telephone is well-known to persons skilled in the art and will therefore not be further explained here.

Short-Range Devices 120-125

Figure 3B:
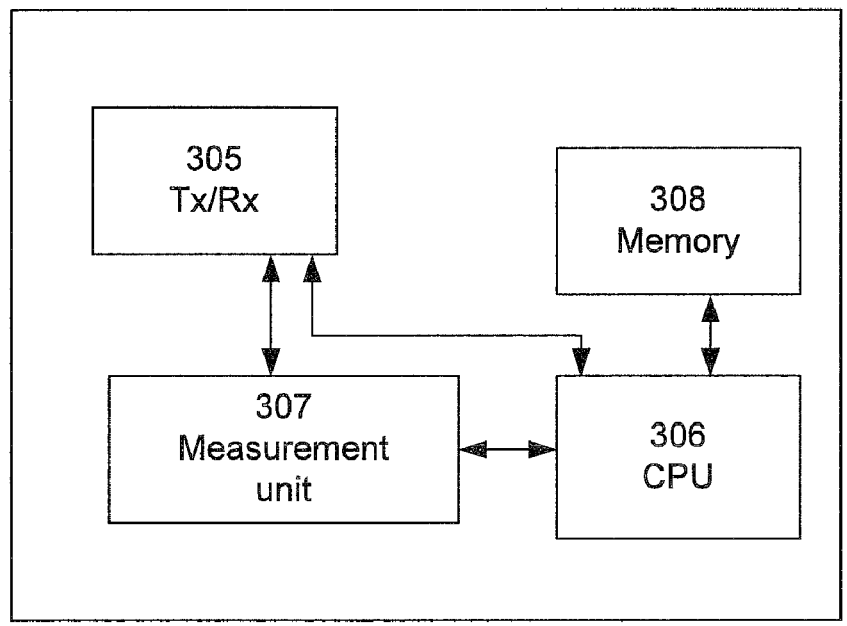
FIG. 3B is a block diagram of an embodiment of an exemplary short-range device of FIGS. 1 and 2.

FIG. 3B illustrates an embodiment of a short-range device 120-125 shown in FIGS. 1 and 2. In the disclosed embodiment, a short-range device comprises a transceiver 305, a controller such as a Central Processing Unit (CPU) 306, a measurement unit 307, and a memory 308.

The transceiver 305 is configured to communicate, via an antenna (not shown), short-range signals with other short-range devices and/or with the mobile terminal 110. The short-range radio signals may e.g. be communicated according to the Bluetooth® technology.

The transceiver 305 includes a receiver configured to receive a short-range radio signal from a mobile terminal 110 located within the local area 200. Furthermore, the short-range device includes a measurement unit 307, which is configured to perform a signal measurement of signal delay, signal strength, or both signal delay and signal strength of said received radio signal. The transceiver 305 further includes a transmitter configured to transmit information about the signal measurement to an electronic apparatus within the local area. The electronic apparatus will be described in further detail below.

In the disclosed embodiment, the receiver of the transceiver 305 is additionally configured to receive information about at least one further signal measurement of signal delay, signal strength, or both signal delay and signal strength of a radio signal received from the mobile terminal, wherein said at least one further signal measurement has been performed by one or more other short-range device of the plurality of short-range devices.

The measurement unit 307 may be implemented by means of a separate hardware component, such as a processor, an ASIC (Application Specific Integrated Circuit) or an FPGA (Field programmable Gate Array). Alternatively, the measurement unit 307 is implemented as a software component, i.e. software program code means, which may be run by controller 306 or a separate processor. The program code means may e.g. be stored in memory 308. The measurement unit 307 could also be implemented as a combination of a software and hardware component.

Electronic Apparatus 130

Figure 3C:
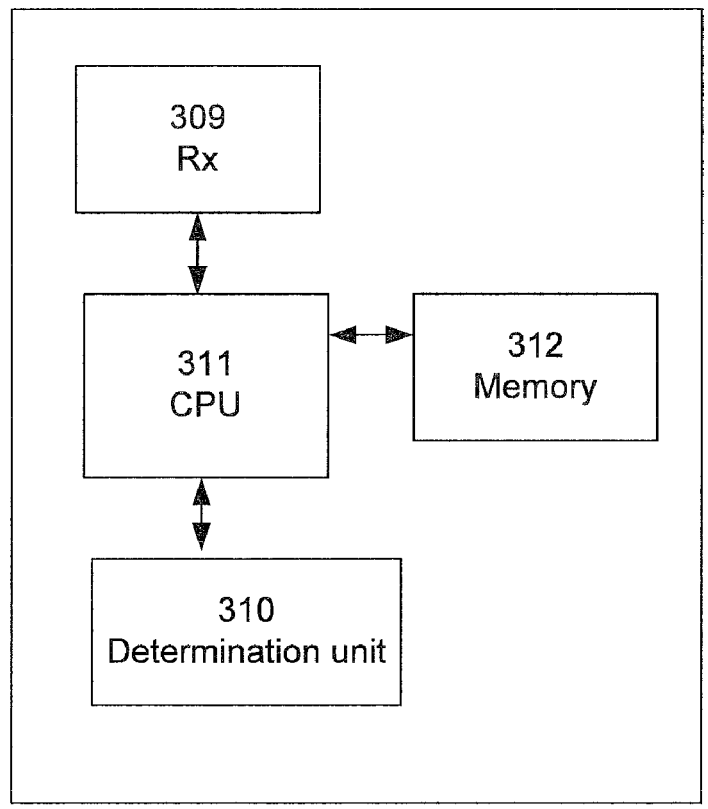
FIG. 3C is a block diagram of an embodiment of the electronic apparatus of FIGS. 1 and 2.

FIG. 3C illustrates an embodiment of the electronic apparatus 130 shown in FIGS. 1 and 2. In the preferred and disclosed embodiment, the electronic apparatus 130 acts as a central server device between the short-range devices 120-125 and the electronic appliances 140-143 to be controlled. The electronic apparatus 130 includes a receiver 309 for receiving, from the one or more of the short-range devices 120-125, information about signal measurement performed by the one or more short-range devices 120-125. As is illustrated in FIG. 3B, the electronic apparatus 130 also comprises a determination unit 310. The determination unit configured to determine the location of the mobile terminal by comparing different signal measurements performed by the one or more short-range devices 120-125. Based on this, the determination unit 310 is operable to determine which of the plurality of short-range devices 120-125 is located in closest proximity to the mobile terminal 110 (which is located within the local area 200). The electronic apparatus 130 further includes a controller, e.g. a Central Processing Unit (CPU), 311 together with an associated memory 312 for storing application software, databases and data to be transmitted to electronic appliances 140-143. According to embodiments of the invention, the controller is configured to control the operation of one or more electronic appliance 140-143 in dependence of the determined location of the mobile terminal, as described earlier.

The determination unit 310 may be implemented by means of a separate hardware component, such as a processor, an ASIC (Application Specific Integrated Circuit) or an FPGA (Field programmable Gate Array). Alternatively, the determination unit 310 is implemented as a software component, i.e. software program code means, which may be run by controller 311 or a separate processor. The program code means may e.g. be stored in memory 312. The determination unit 310 may also be implemented as a combination of a software and hardware component. The determination unit 310 may also be implemented as a combination of a software and hardware component.

In the following, a method of controlling the operation of one or several electronic appliances 140-143 within a local area will be described in some more detail.

Figure 4:
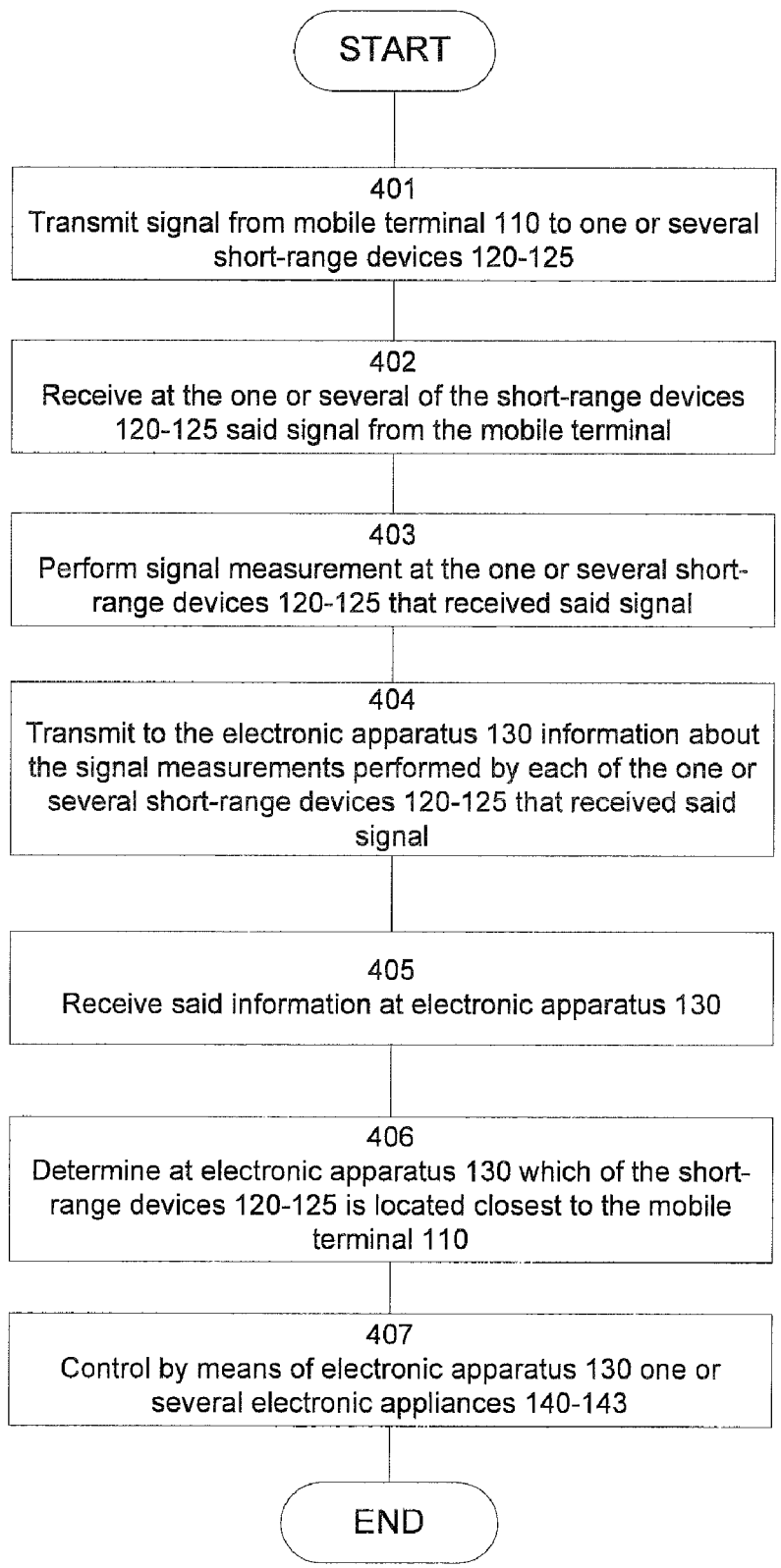
FIG. 4 is a flowchart illustrating an embodiment of a method of controlling the operation of one or more electronic appliances within a local area.

FIG. 4 illustrates a method of controlling the operation of one or several electronic appliances 140-143 within a local area, according to an embodiment of the invention. In step 401, a short-range radio signal (e.g. according to the Bluetooth® technology) is transmitted from a mobile telephone 110 to one or several short-range devices 120-125, which are located within the local area, e.g. home 200.

In a step 402, a short-range radio signal transmitted from the mobile telephone 110 is received at one or several short-range devices 120-125. Then, in a step 403, a signal measurement of signal delay, signal strength, or both signal delay and signal strength of said short-range radio signal received from the mobile telephone 110 is performed by each of the short-range devices that received the short-range radio signal from the mobile telephone 110. In a further step 404, information about the signal measurement is transmitted from each short-range device to the electronic apparatus 130.

In a step 405, the information about the signal measurements performed by each of the plurality of short-range devices is received at the electronic apparatus 130. In response thereto, the location of the mobile terminal 110 can be determined, in step 406, by means of the electronic apparatus 130. The determination in step 406 may comprise comparing the different measurements performed by the plurality of short-range devices, and in response determining which of the plurality of short-range devices is located in closest proximity to the mobile terminal. Finally, in a step 407, the operation of one or more electronic appliance in the local area, e.g. home 200, is controlled by the electronic apparatus 130 in dependence of where in the local area the mobile terminal (and, hence, in most cases where the user) is positioned.

The terminology used in this specification is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention has been described above with reference to specific embodiments. However, other embodiments than those described are possible within the scope of the invention. For example, embodiments of the present invention have mainly been described with reference to short-range devices in the form of Bluetooth devices. However, other short-range devices such as e.g. WiFi access points or the like scattered throughout the local area could equally possible be used for the same or a similar purpose. Moreover, the detailed description has referred to various scenarios in which embodiments of the present invention may be implemented. However, the skilled man would recognize that other scenarios than those described are also possible within the scope of the invention. Different method steps than those described above, performing the method by hardware or software or a combination of both hardware and software may be provided within the scope of the invention. The different features and method steps of the invention can be combined in other combinations than those described. The invention is only limited by the appended claims.

What is claimed is:

1. A system for controlling the operation of at least one electronic appliance within a local area, the system comprising:
   (a) a mobile terminal located within the local area and configured to transmit a short-range radio signal to a short-range device;
   (b) a plurality of short-range devices within the local area, wherein each short-range device of the plurality of short-range devices is configured to receive the short-range radio signal from the mobile terminal; perform a signal measurement of signal delay, signal strength, or both signal delay and signal strength of said short-range radio signal received from the mobile terminal; and transmit information about said measurement to a central server;
   (c) the central server configured to receive information about said signal measurement from the plurality of short-range devices within the local area; in response thereto determine the location of the mobile terminal; and control the operation of the at least one electronic appliance in dependence of the determined location of the mobile terminal.

2. The system according to claim 1, wherein the central server is configured to determine the location of the mobile terminal by comparing the different signal measurements performed by the short-range devices and based on said comparison determine which of the plurality of short-range devices is located in closest proximity to the mobile terminal.

3. The system according to claim 2, wherein the mobile terminal is a device from the group comprising: a portable radio communication equipment, a mobile radio terminal, a mobile telephone, a cellular telephone, a pager, a communicator, an electronic organizer, a smart phone, a computer or a headset.

4. A short-range device for assisting a central server in controlling the operation of at least one electronic appliance within a local area, the short-range device comprising:
   a receiver configured to receive a short-range radio signal from a mobile terminal located within the local area;
   a measurement unit configured to perform a signal measurement of signal delay, signal strength, or both signal delay and signal strength of said radio signal received from the mobile terminal; and
   a transmitter configured to transmit information about the signal measurement to the central server within the local area.

5. The short-range device according to claim 4, wherein the receiver is additionally configured to receive information about at least one further signal measurement of signal delay, signal strength, or both signal delay and signal strength of the radio signal received from the mobile terminal, wherein said at least one further signal measurement is performed by another short-range device of a plurality of short-range devices within the local area; and the transmitter is additionally configured to transmit the information about the at least one further signal measurement to the central server.

6. The short-range device according to claim 4, wherein the short-range device is an accessory device or a stand-alone short-range device.

7. The short-range device according to claim 6, wherein the short-range device is a Bluetooth device configured to communicate short-range radio signals according to a Bluetooth technology.

8. The central server for use with the short-range device according to claim 4 for controlling the operation of at least one electronic appliance within the local area, the central server comprising:
   a receiver configured to receive from the short-range device information about said signal measurement;
   a determination unit configured to determine the location of the mobile terminal based on the received information about said signal measurement; and
   a controller configured to control the operation of the at least one electronic appliance in dependence of the determined location of the mobile terminal.

9. The central server according to claim 8, wherein the determination unit is configured to determine the location of the mobile terminal by comparing different signal measurements performed by different short-range devices of a plurality of short-range devices and determine based on said comparison which short-range device of the plurality of short-range devices is located in closest proximity to the mobile terminal.

10. The central server according to claim 9, wherein the controller is configured to control the operation of the at least one electronic appliance via a wired connection or via a wireless connection.

11. The central server according to claim 10, wherein the controller is configured to control the operation of the at least one electronic appliance in dependence of the information about the determined location of the mobile terminal, wherein the at least one electronic appliance is an appliance from the group comprising: the mobile terminal, a TV, a display screen, a music system, a speaker, a lighting system, a kitchen appliance, a home entertainment system, an alarm system, a surveillance system, a personal computer (PC), or a telephone.

12. A method of controlling the operation of at least one electronic appliance within a local area, the method comprising:
   (a) transmitting from a mobile terminal within the local area a short-range radio signal to one or more short-range devices;
   (b) receiving at a plurality of short-range devices within the local area the short-range radio signal from the mobile terminal; performing at each short-range device a signal measurement of signal delay, signal strength, or both signal delay and signal strength of said short-range radio signal received from the mobile terminal; and transmitting from each short-range device information about the signal measurement to a central server;
   (c) receiving at the central server the information about said signal measurements performed by the plurality of short-range devices; in response thereto determining the location of the mobile terminal, and further controlling the operation of the at least one electronic appliance in dependence of the determined location of the mobile terminal.

13. The method according to claim 12, wherein the determining comprises:
   comparing the different measurements performed by the plurality of short-range devices; and
   determining which of the plurality of short-range devices is located in closest proximity to the mobile terminal based on said comparison.

14. A computer program product comprising computer program code means for performing the method according to claim 12 when said computer program code means is executed by means of an electronic device having computer capabilities.

15. A method of assisting in controlling the operation of at least one electronic appliance within a local area, the method being performed by a short-range device and comprising:
- receiving a short-range signal from a mobile terminal located within the local area;
- performing a measurement of signal delay, signal strength, or both signal delay and signal strength of said radio signal received from the mobile terminal; and
- transmitting information about the signal measurement to a central server within the local area.

16. The method according to claim 15, further comprising:
- receiving information about at least one further signal measurement of signal delay, signal strength, or both signal delay and signal strength of said radio signal received from the mobile terminal, wherein said at least one further signal measurement is performed by another short-range device of a plurality of short-range devices within the local area; and
- transmitting the information about the at least one further signal measurement to the central server within the local area.

17. A method performed by the central server for the use with the method according to claim 15 for controlling the operation of at least one electronic appliance within the local area, the method comprising:
- receiving from the short-range device information about said signal measurement;
- determining the location of the mobile terminal based on the received information about said signal measurement; and
- controlling the operation of the at least one electronic appliance in dependence of the determined location of the mobile terminal.

18. The method according to claim 17, wherein the determining comprises:
- determining the location of the mobile terminal by comparing different signal measurements performed by different short-range devices of a plurality of short-range devices and determining which short-range device of the plurality of short-range devices is located in closest proximity to the mobile terminal.

* * * * *

UNITED STATES PATENT AND TRADEMARK OFFICE
CERTIFICATE OF CORRECTION

PATENT NO.       : 7,843,333 B2                                          Page 1 of 1
APPLICATION NO.  : 11/679961
DATED            : November 30, 2010
INVENTOR(S)      : Anders Angelhag et al.

It is certified that error appears in the above-identified patent and that said Letters Patent is hereby corrected as shown below:

Column 16, line 1, "for the use" should read
-- for use --.

Signed and Sealed this
First Day of March, 2011

David J. Kappos
*Director of the United States Patent and Trademark Office*